(12) United States Patent
Sellers et al.

(10) Patent No.: US 8,840,120 B2
(45) Date of Patent: Sep. 23, 2014

(54) SLED WITH A CALF-SECURING STRAP

(71) Applicants: David Sellers, Warren, VT (US); Parker Sellers, Warren, VT (US)

(72) Inventors: David Sellers, Warren, VT (US); Parker Sellers, Warren, VT (US)

(*) Notice: Subject to any disclaimer, the term of this patent is extended or adjusted under 35 U.S.C. 154(b) by 0 days.

(21) Appl. No.: 13/867,382

(22) Filed: Apr. 22, 2013

(65) Prior Publication Data
US 2013/0307233 A1 Nov. 21, 2013

Related U.S. Application Data

(60) Continuation of application No. 11/610,800, filed on Dec. 14, 2006, now abandoned, which is a division of application No. 10/716,032, filed on Nov. 17, 2003, now Pat. No. 7,165,775, and a continuation-in-part of application No. 10/329,288, filed on Dec. 24, 2002, now abandoned.

(51) Int. Cl.
*B62B 13/06* (2006.01)
*B62B 17/06* (2006.01)
*B62B 15/00* (2006.01)

(52) U.S. Cl.
CPC ........... *B62B 15/00* (2013.01); *B62B 2501/065* (2013.01); *B62B 17/067* (2013.01)

USPC ............................................................ 280/18

(58) Field of Classification Search
USPC ............... 280/18, 18.1, 19, 21.1, 24, 87.041, 280/87.01; 441/68, 74, 75
See application file for complete search history.

(56) References Cited

U.S. PATENT DOCUMENTS

| | | | | |
|---|---|---|---|---|
| 2,484,494 | A * | 10/1949 | Ferguson | 2/24 |
| 3,931,656 | A * | 1/1976 | Thomson | 441/75 |
| 4,028,761 | A * | 6/1977 | Taylor | 441/65 |
| D265,116 | S * | 6/1982 | Churchill | D21/770 |
| 4,598,927 | A * | 7/1986 | Monreal | 280/611 |
| 4,629,434 | A * | 12/1986 | Monreal | 441/65 |
| 4,717,362 | A * | 1/1988 | Kraft | 441/82 |
| 4,960,063 | A * | 10/1990 | Bontemps | 114/39.19 |
| 5,427,391 | A * | 6/1995 | Cooper | 280/11.19 |
| 5,820,430 | A * | 10/1998 | Hornsby et al. | 441/65 |
| 5,941,540 | A * | 8/1999 | O'Haire | 280/18 |
| 6,805,657 | B2 * | 10/2004 | Trenary | 482/51 |
| 2007/0176376 | A1 * | 8/2007 | Maier | 280/18.1 |

* cited by examiner

*Primary Examiner* — Frank Vanaman
(74) *Attorney, Agent, or Firm* — Occhiuti & Rohlicek LLP

(57) ABSTRACT

A sled includes a hull and a strap extending transversely across the hull. The strap extends across the hull at a first longitudinal position selected such that it extends across the calves of a kneeling rider. This enables the rider to kneel erect when riding the sled.

20 Claims, 11 Drawing Sheets

SLED WITH A CALF-SECURING STRAP

RELATED APPLICATIONS

This application is a continuation of U.S. application Ser. No. 11/610,800, filed on Dec. 14, 2006, which is a divisional of U.S. patent application Ser. No. 10/716,032, filed on Nov. 17, 2003, and a continuation-in-part of U.S. patent application Ser. No. 10/329,288, filed on Dec. 24, 2002, the contents of which are herein incorporated by reference in their entirety.

FIELD OF INVENTION

The invention relates to sleds, and in particular, to sleds having a restraint system.

BACKGROUND

To a great extent, control over a moving sled is achieved by shifting one's weight. When turning, for example, one leans in the direction of the turn. In negotiating bumpy terrain, one constantly leans forward and backward in an effort to keep the sled on the snow.

In effect, the shifting of one's weight causes small, almost imperceptible perturbations in the position of an imaginary point, referred to as the center-of-mass. A rider's ability to quickly and precisely control these perturbations permits the performance of various stunts or acrobatic maneuvers on the sled.

A rider can shift the center of mass in three dimensions. By leaning to one side, the rider shifts the center-of-mass transversely. Leaning backwards or forwards shifts the center-of-mass longitudinally. Sitting up straight or crouching shifts the center-of-mass vertically.

Known sleds, such as that disclosed in Sellers, U.S. Pat. No. 4,666,171, feature a strap extending transversely across the rider's knees. This strap secures the rider's legs in a flexed position, and thereby limits the rider's ability to vertically adjust the center-of-mass.

SUMMARY

In one aspect, the invention includes a sled having a hull, and a strap extending transversely across the hull. The strap extends across the hull at a first longitudinal position selected such that it extends across the calves of a kneeling rider. This enables the rider to kneel erect when riding the sled.

In one embodiment, the strap is adjustable between the first longitudinal position and a second longitudinal position. The second longitudinal position in this case can be selected such that when the strap is extended-across the hull the second longitudinal position, it extends across the thighs of a kneeling rider.

Another embodiment includes a first pair of transversely opposed anchor points on opposite sides of the hull for engaging respective first and second ends of the strap. The anchor points are disposed astern of a shin-receiving area on the hull such that the strap extends across the calves of a kneeling rider.

In certain embodiments, an optional second pair of anchor points is disposed to be adjacent to the shin-receiving area. A strap extending between the anchor points of the second pair thus passes across the thighs of a kneeling rider.

In another aspect, the invention includes a sled having a hull and a first pair of transversely opposed anchor points on opposite sides of the hull for engaging respective first and second ends of a strap. The anchor points are disposed such, that a strap extending between the anchor points extends across the calves of a kneeling rider.

One embodiment also includes a strap extending across the hull between the anchor points.

In another embodiment, there is a second pair of transversely opposed anchor points on opposite side of the hull for engaging respective first and second ends of a strap. The second pair of anchor points being longitudinally displaced relative to the first pair of anchor points. For example, the second pair of anchor points can be disposed such that a strap extending between the anchor points of the second pair extends across the thighs of the kneeling rider.

These and other features and advantages of the invention will be apparent from the following detailed description and the accompanying figures, in which:

These and other features and advantages of the invention will be apparent from the following detailed description and the figures, in which:

DESCRIPTION OF THE PREFERRED EMBODIMENT

A downhill racing sled suitable for incorporating the features of the invention is described with particularity in Sellers, U.S. Pat. No. 4,666,171, the contents of which are herein incorporated by reference.

Figure 1:
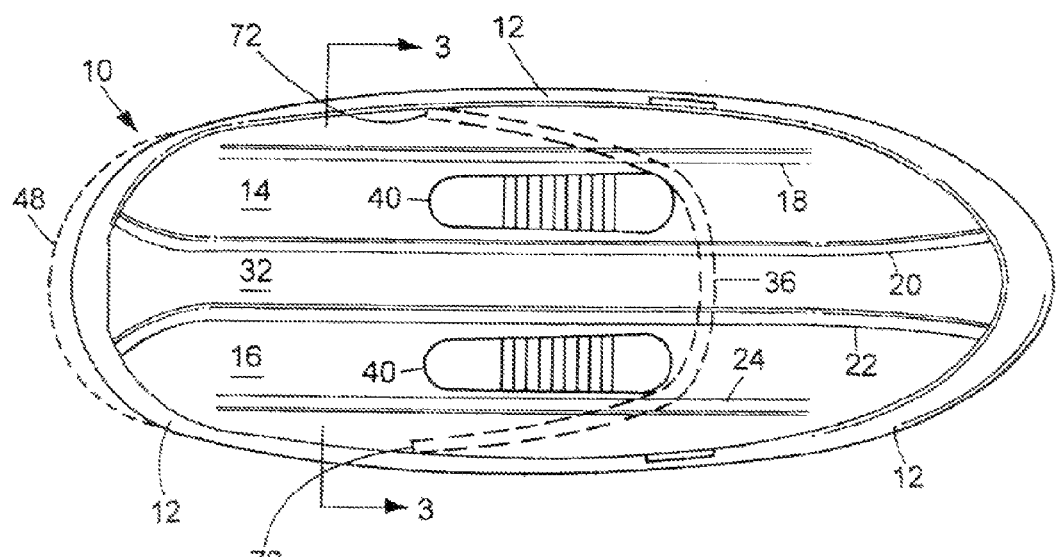
FIG. 1 is a top view of a hull for a sled.
Figure 2:
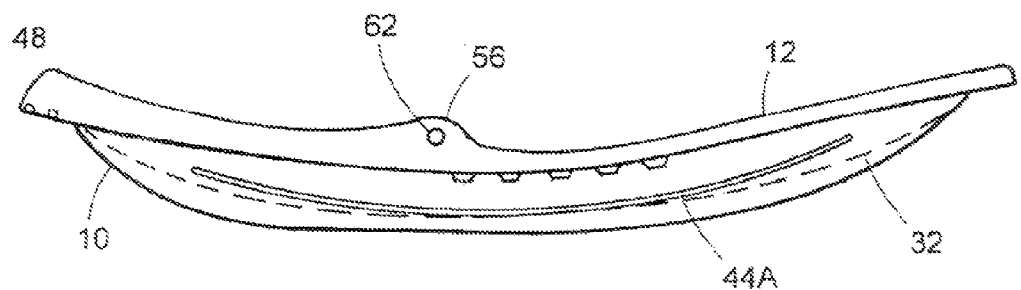
FIG. 2 is a side view of a hull for a sled.
Figure 3:
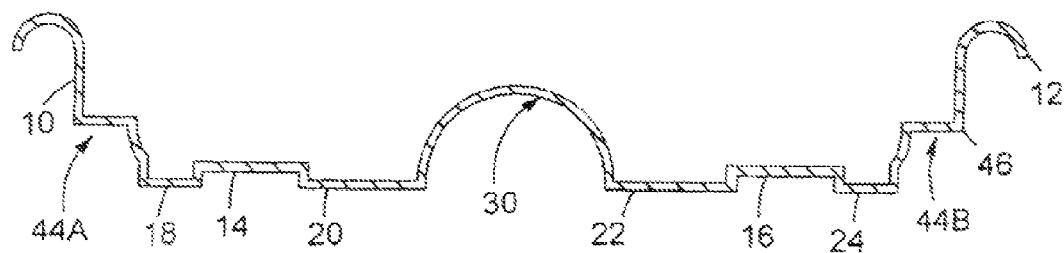
FIG. 3 is a cross-section of the hull shown in FIGS. 1 and 2.

As shown in FIGS. 1-3, the sled includes a one-piece elongated molded hull 10, preferably of vacuum-molded thermoplastic. The hull 10 has a bow or front-end, which is on the right as viewed in FIGS. 1 and 2, and a stern, or rear-end, which is on the left as viewed in FIGS. 1 and 2. Between the bow end and the stern end are a pair of optional contoured shin pads 40 on which a rider kneels while riding the sled.

The hull 10 presents a generally crescent-shaped profile, best seen in FIG. 2. An upper outwardly rolled molded edge of the hull 10 forms continuous railings or gunwales 12 surrounding the hull 10. The gunwales 12 are raised at the bow to afford handholds and to protect against the intrusion of snow. The bottom of the hull 10 while generally curved in profile as shown in FIG. 2, includes certain features that enhance the sled's performance in deep snow.

Between the two runners 14 and 16, a main central channel 30 extends along a mid-line of the hull 10 from the bow to the stem with progressively increasing depth as shown in FIGS. 2 and 3. The inside ribs 20 and 22 define the edges of the channel 30 and are slightly outwardly flared with gradually increasing spacing at both ends of the hull 10. Inside the hull 10, the molded channel 30 forms a large longitudinal central rib or keel-like hump 32 running down the center of the hull 10. Because of the increasing depth of the snow channel 30 toward the rear of the hull 10, the hump 32 becomes more pronounced toward the rear as shown in phantom in FIG. 2.

Figures 4, 5:
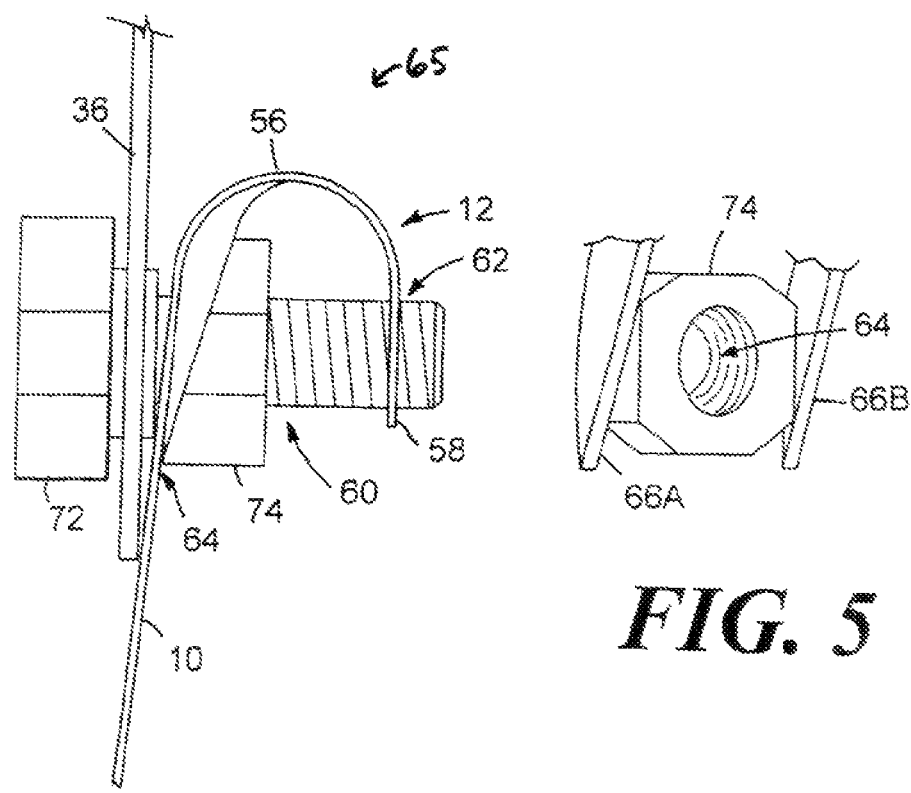
FIG. 4 shows a configuration for attaching a strap to the hull of the sled shown in FIG. 1.
FIG. 5 shows a nut used in use in the configuration shown in FIG. 4.

Referring now to FIG. 4, side portions of the gunwale 12 are rolled outward to form a lip 56. This lip 56 curls downward to form a rim portion 58 parallel to the hull 10 and separated therefrom by a gap 66. An outboard hole 62 through the rim portion 58 is aligned with an Inboard hole 64 through the bull 10. Molded retaining walls 66A-B, seem in isometric view in FIG. 5 flank the inboard hole 64 and extend outward from the hall 10, part way across the gap 60.

Figure 6:
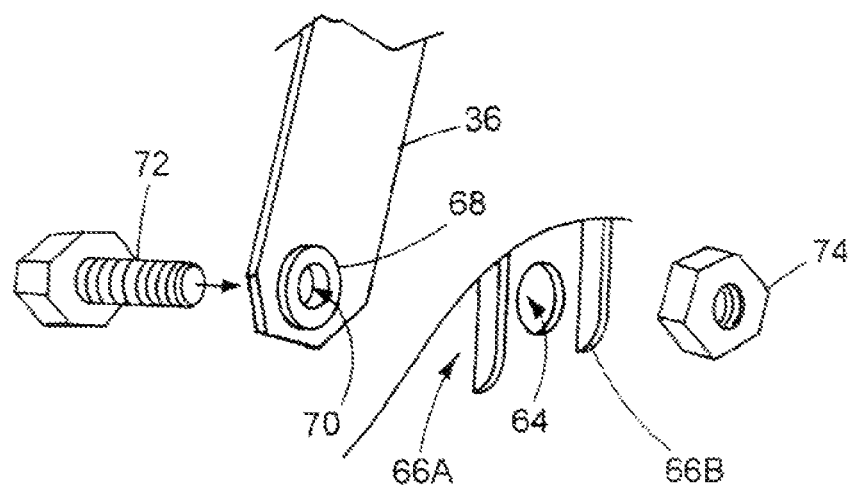
FIG. 6 shows an exploded view of the configuration shown in FIG. 4.

A strap 36 has a grommet 68 at each of its two ends, one of which is shown in FIG. 6. To attach the strap 36 to the hull 10, a grommet hole 70 defined by the grommet 60 is aligned with the inboard hole 64. Then, a threaded ½ inch bolt 72 is passed through the grommet hole 70 and through the inboard hole 64. The bolt 72 is long enough to extend through the inboard hole 64 and all the way to the outboard hole 62. Preferably, the bolt 72 extends approximately 3/16 inches beyond the outboard hole 62 to ensure adequate support, by the edge of the outboard hole 62.

Figure 8:
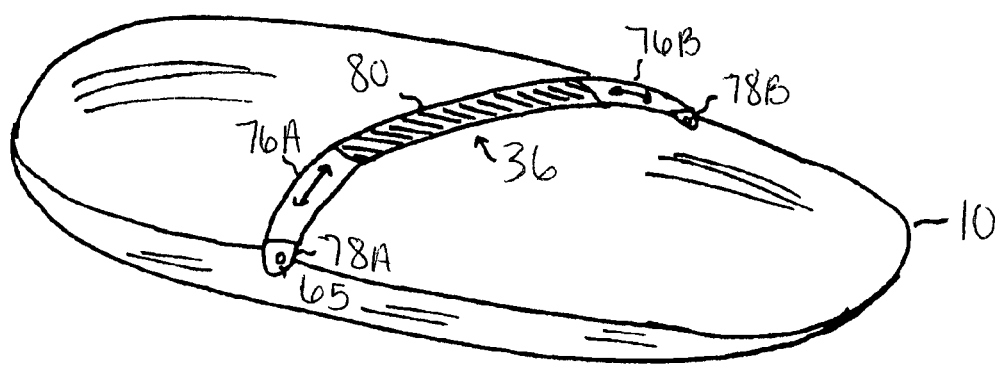
FIG. 8 shows a sled having a strap with elastic end portions and an inelastic central portion.

A nut 74 is then threaded onto the bolt 72 to secure the bolt 72 to the hull 10. When the nut 74 is fully tightened, it comes to rest snugly between the retaining fins 66A-B, as shown in FIG. 8. The retaining fins 66A-E thus limit rotation of the nut 74 in response to torque transmitted by the strap 36. By doing so, the retaining fins 66A-B reduce the likelihood that the nut 74 will loosen during use. The nut 74, the bolt 72, and the walls forming the inboard and outboard holes 62, 64 collectively define a strap anchor 65.

Because of its strength, metal is typically used for making the nut 74 and bolt 72. However, other materials, such as plastic can be used.

A shear force exerted on the strap 36 is transmitted to the hall 10 by the bolt 72. However, the hull 10 supports the bolt 72 at two different points, namely at the edge of the inboard hole 64 and also at the edge of the outboard hole 62. As a result the strap-anchoring configuration shown in FIGS. 4-6 resists the tendency of the bolt 72 to pivot about a single support in response to a shear force. It does so by resisting shear force using shear resistance provided by the hull 10 at two different support points.

By concealing the nut 74 and bolt 72 from view, the rim portion 58 of the lip provides the hull 10 with a more attractive and streamlined appearance. This appearance can be enhanced by coloring the end of the bolt 72 or by extending the end of the bolt 72 slightly beyond the rim portion 58 so it can be capped.

In addition, by covering the nut 74 and bolt 72, the rim portion 58 also prevents the nut 74 and bolt 72 from snagging on nearby objects, such as the rider's clothing.

Figure 7:
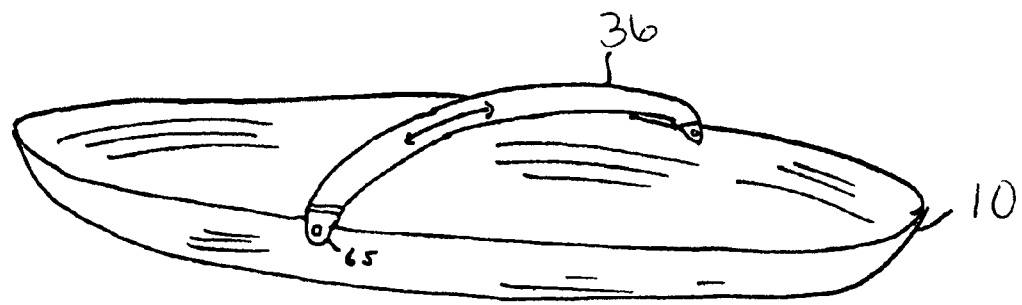
FIG. 7 shows a sled with an elastic strap.
Figure 9:
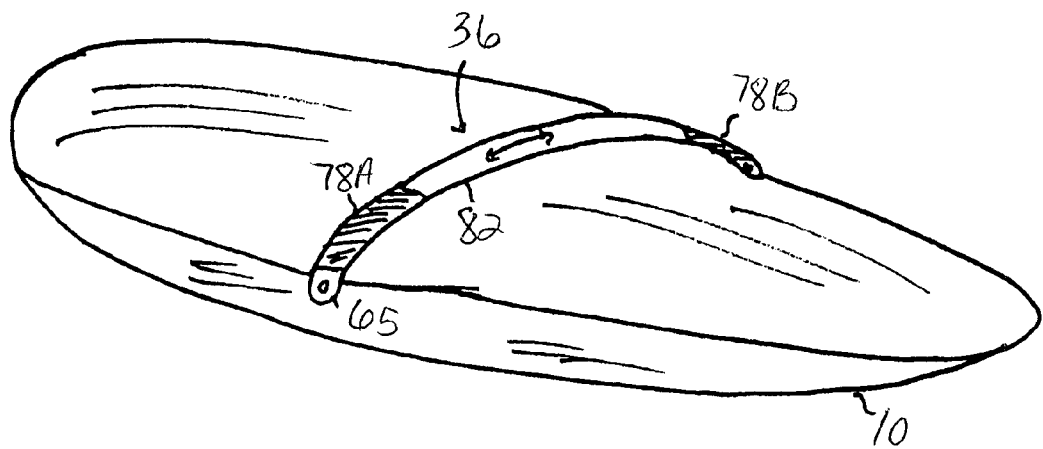
FIG. 9 shows a sled having a strap with inelastic grommet portions and an elastic central portion.

In one embodiment, the strap 36 has a length that varies in response to the force exerted thereon. An example of such a strap 36 is an elastic strap as shown in FIG. 7. Another example is a strap 36 having one or more elastic sections 76A-B, as shown in FIG. 8. In this case, the strap 36 has a pair of inelastic grommet sections 78A-B that accommodate the grommets 68 and a central inelastic section 80 for securing the rider. Each grommet section 78A-B is connected to the central inelastic section 80 by a corresponding one of the elastic sections 76A-B. Yet another example, shown in FIG. 9 is a strap 36 having a pair of inelastic grommet sections 78A-B joined by a central elastic section 82.

Preferably, the elasticity of the strap 36, or the elasticity of an elastic section, thereof, is such that the strap 36 changes in length by no more than three inches. A strap 36 that is excessively elastic, in which the length changes significantly, will fail to restrain the rider. A strap 36 that has too little elasticity will be uncomfortable in the presence of high g-forces.

The elastic sections can be made of a manufactured fiber in which the fiber-forming substance is a long-chain synthetic polymer comprised of at least 85% of a segmented polyurethane. An exemplary fiber having these properties is presently sold under the name SPANDEX™. The elastic sections can also be made of a manufactured elastic fiber sold under the name SPANDURA™.

The inelastic sections can be made of a manufactured fiber in which the fiber forming substance is a long-chain synthetic polyamide in which less than 85% of the amide-linkages are attached directly (—CO—NH—) to two aliphatic groups. An exemplary fiber having these properties is presently sold under the name NYLON™.

Figure 10:
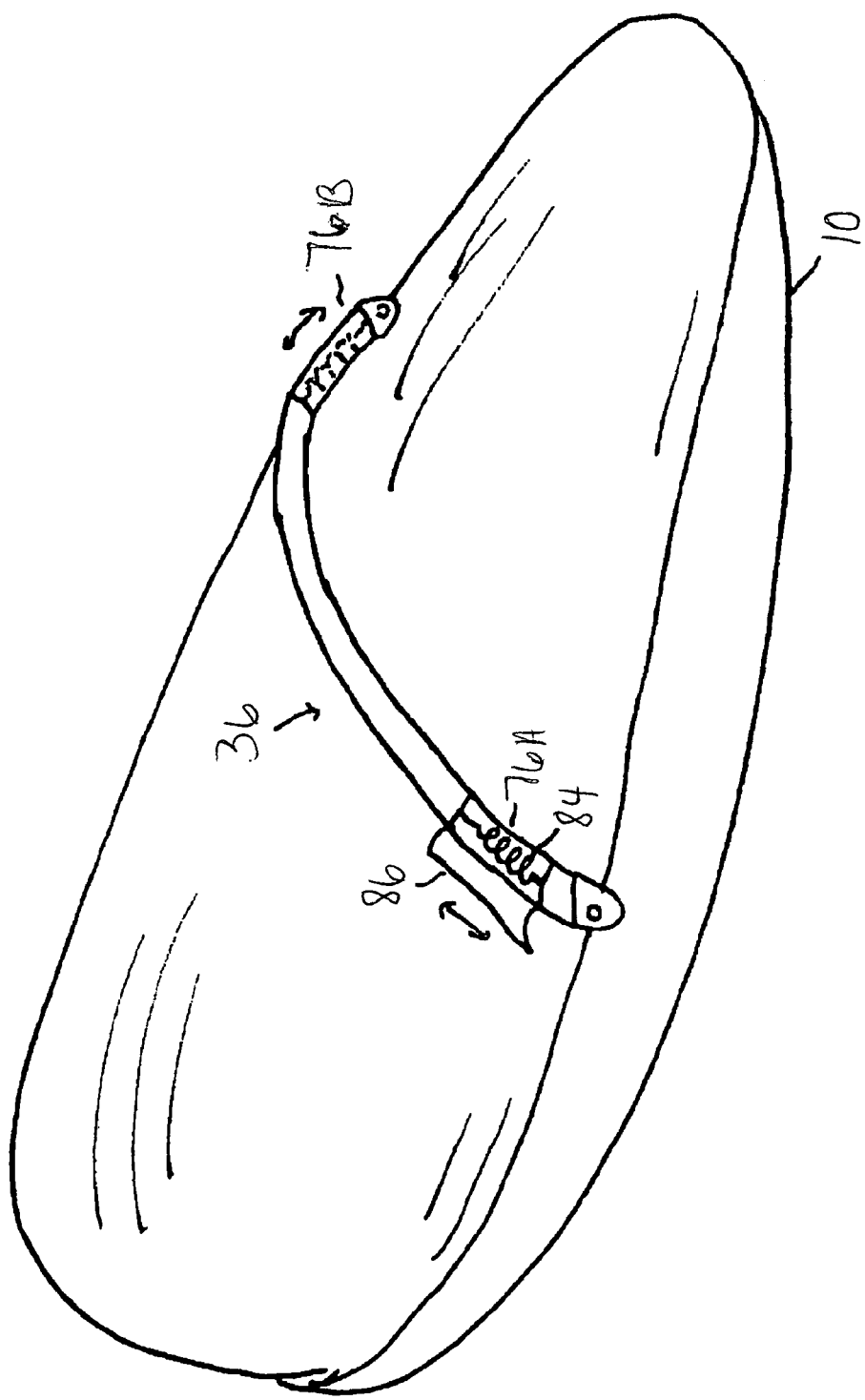
FIG. 10 shows a sled having a strap with springs at its ends.

Another embodiment, shown in FIG. 10, features an elastic section 76A in which the elasticity is provided by a spring 84. The spring 84 is sheathed by a fabric jacket 86 (opened to expose the spring 84 in FIG. 10) to protect the rider's clothing from being caught by the spring 84 as it expands and contracts.

Figure 11:
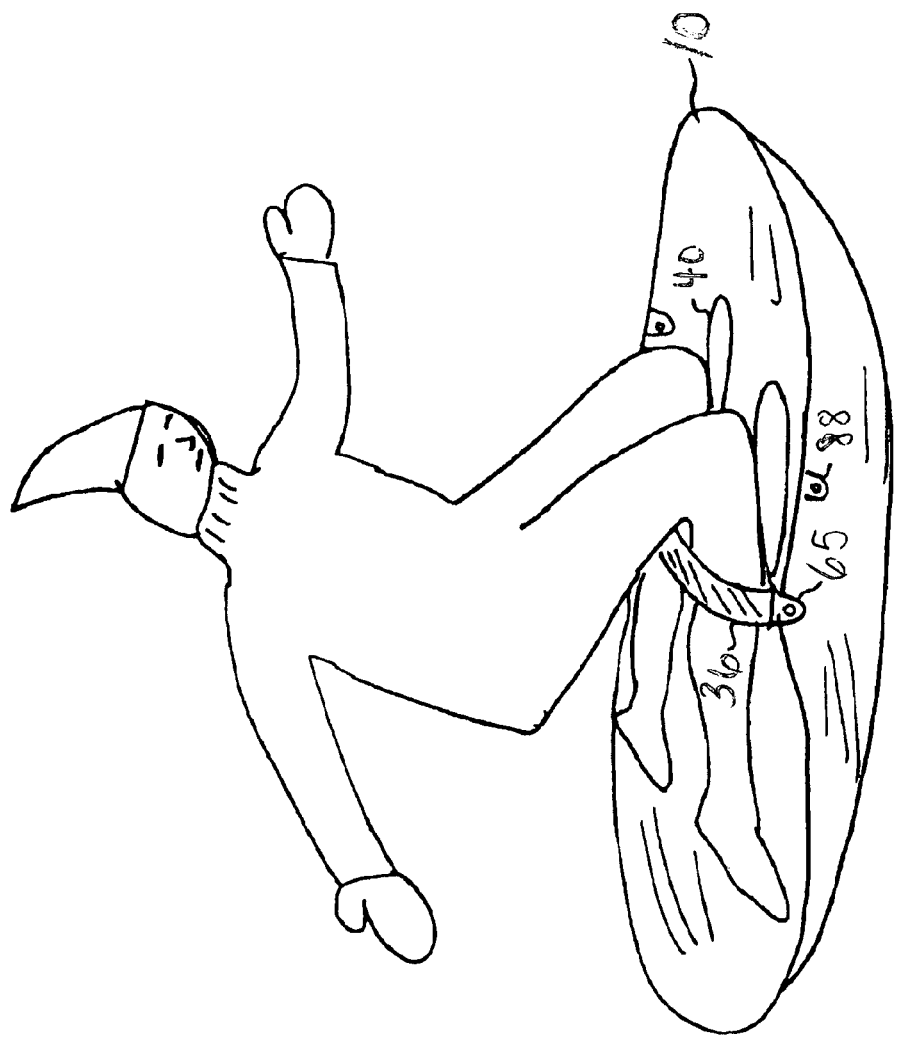
FIG. 11 shows a sled having a strap configured to secure a rider's calves.

The longitudinal position of the strap anchor 65 can be chosen so that the strap 36 extends across the hull 10 above the shin pads 40. In this configuration, the strap 36 extends over the rider's thighs. However, the strap 36 can also be placed astern of the shin pads 40 so that the strap 36 extends over the rider's upper calves, as shown in FIG. 11. In this latter configuration, the strap 36 secures the rider's calves and thereby frees the rider from having to ride with fully flexed knees at all times. A rider thus treed is able to kneel erect or partially erect in the sled, thereby enabling the rider to shift the center-of-mass vertically by a distance that corresponds to the difference between the rider's fully erect position and the rider's fully crouched position.

In FIG. 11, the strap 36 can be switched between a rear pair of strap anchors 65 and a forward pair of strap anchors 88 that are structurally the same as the rear pair of strap anchors 65 but positioned over the shin pads 40. The sled shown in FIG. 11 is thus convertible between the configuration shown in FIG. 11, in which the strap 36 secures the rider's calves, and a configuration in which the strap 36 secures the rider's thighs.

A disadvantage of having a single strap 36 that extends across the hull 10 is that in sharp turns, both of the rider's legs are apt to shift, laterally. This causes the center-of-mass of the combined rider and sled to also shift laterally. This lateral shift during a turn undermines the stability of the turn and, in extreme cases, can capsize the sled.

Figure 12:
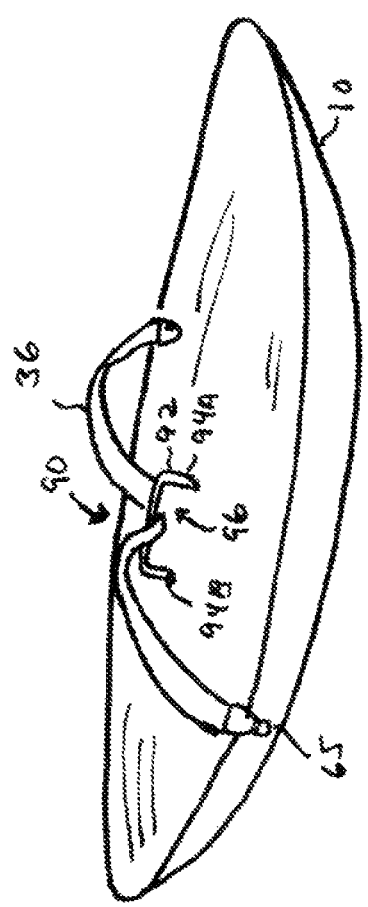
FIG. 12 shows a sled having a strap that extends through a center anchor.

To avoid this difficulty, another embodiment of the sled, features a center anchor 90 at the mid-line of the hull 10. An exemplary center anchor 90, shown in FIG. 12, is a longitudinally extending horizontal bar 92 supported over the hull by a vertically-extending bow leg 94A and a vertically-extending stern leg 94B. The bar 92 and the two legs 94A-B define an aperture 96 through which a strap 36 extending transversely across the hull 10 passes. When the strap 36 is looped through the center anchor 90, as shown in FIG. 12, the rider's legs are individually secured. This makes it more difficult for the rider's legs to shift laterally in a sharp turn.

Figure 13:
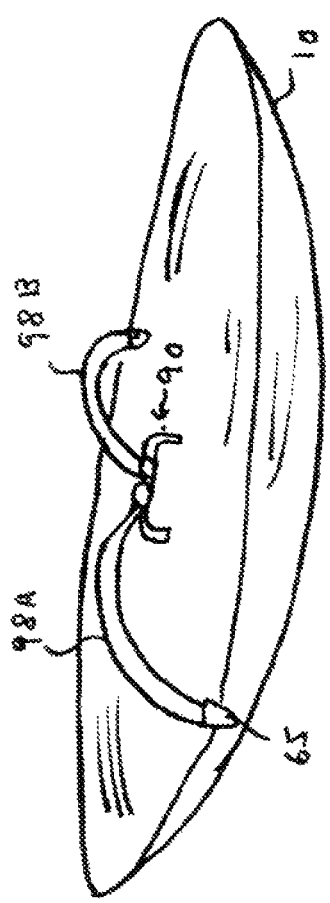
FIG. 13 shows a sled having a pair of straps, each of which connects to a center anchor.

In FIG. 13, the single strap 36 extending across the hull 10 is replaced by a pair of straps 98A, 98B, each one of which extends from a strap anchor 65 to the center anchor 90. This embodiment enables the rider to individually adjust the straps 98A, 98B.

Figure 14:
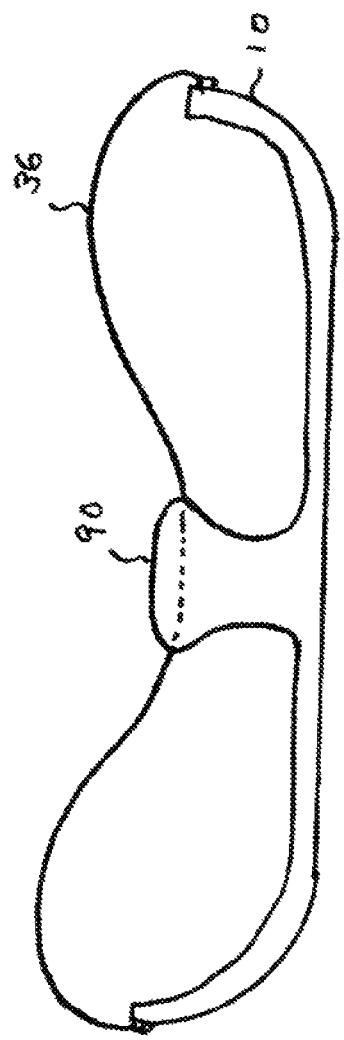
FIG. 14 shows a cross-section of a sled having a hump.

In another embodiment, shown in FIG. 14, the center anchor 90 is molded and/or padded to more closely fit die rider's thighs. This embodiment can be configured to accommodate a single strap 36 looping through an aperture in the center anchor 90 or a pair of straps extending in opposite directions from the center anchor 90 to each of the two sides of the hull 10.

The invention has been described in the context of a specific recreational racing sled. However, the various features of the invention can readily be incorporated other types of recreational sleds.

Having described the invention, and a preferred embodiment thereof, I now claim as being new and secured by Letters Patent:

1. A manufacture comprising a downhill racing sled for carrying a rider while sliding down a snow-covered slope, said rider having legs, each leg having a thigh, a calf, and a knee for varying an angle between said thigh and said calf, said sled comprising an elongated molded hull having a crescent shaped profile, said hull having longitudinally extending runners extending from a bow of said hull to a stern of said hull, and a channel between said runners for providing lateral stability in snow, a first pair of transversely opposed anchor points on opposite sides of said hull for engaging a strap that extends across said hull, and a second pair of transversely opposed anchor points on opposite sides of said hull for engaging a strap that extends across said hull, said second pair of anchor points being disposed astern of said first pair of anchor points, and a strap attached to one of said first pair and said second pair of transversely opposed anchor points, wherein when said strap is attached to said first pair of transversely opposed anchor points, said strap is configured to pass over said thighs of said rider, and when said strap is attached to said second pair of transversely opposed anchor points, said strap is configured to pass under said thighs of said rider and over said calves of said rider, wherein by attaching said strap to said second pair, said rider is able to cause a center of gravity of a mass defined by a combination of said rider and said sled to move along a line perpendicular to said hull by using said knee to adjust said angle between said calf and said thigh, and wherein when said strap is attached to said first pair, movement of said center of gravity along said line is constrained, wherein said channel defines a hump protruding vertically into said hull, and wherein said hump provides a center anchor for coupling to said strap, said center anchor being configured to anchor said strap to said hull thereby securing said rider's legs individually, thus suppressing lateral shifting of said legs during a turn.

2. The manufacture of claim 1, further comprising means for selectively engaging said strap at one of a first longitudinal position and a second longitudinal position.

3. The manufacture of claim 1, wherein said channel has a progressively increasing depth.

4. The manufacture of claim 1, wherein said hump has a progressively increasing height.

5. The manufacture of claim 1, further comprising contoured shin pads for receiving said rider in a kneeling position.

6. The manufacture of claim 1, wherein said strap has a variable length.

7. The manufacture of claim 1, wherein said strap is made of an elastic material.

8. The manufacture of claim 1, further comprising springs extending between said hull and ends of said strap.

9. The manufacture of claim 1, wherein said center anchor comprises a structure molded to conform to said rider, said center anchor forming an aperture; and wherein said strap passes through said aperture.

10. The manufacture of claim 1, wherein said center anchor comprises a horizontal bar extending longitudinally and supported by vertical legs, said horizontal bar and said vertical legs defining an aperture, and wherein said strap passes through said aperture.

11. The manufacture of claim 1, wherein the center anchor comprises a structure molded to conform to the rider, the center structure forming an aperture for receiving a strap.

12. The manufacture of claim 1, wherein the center anchor comprises a horizontal bar extending supported by vertical legs, the horizontal bar and the vertical legs defining an aperture for receiving a strap.

13. The manufacture of claim 1, further comprising a gunwale surrounding said hull, said gunwale being raised at a bow of said hull for suppressing intrusion of snow into said hull, and providing a handhold for said rider.

14. A manufacture comprising a downhill racing sled for carrying a rider while sliding down a snow-covered slope, said rider having legs, each leg having a thigh, a calf, and a knee for varying an angle between said thigh and said calf, said sled comprising an elongated molded hull having a crescent shaped profile, said hull having longitudinally extending runners extending from a bow of said hull to a stern of said hull, and a channel between said runners for providing lateral stability in snow, a first pair of transversely opposed anchor points on opposite sides of said hull for engaging a strap that extends across said hull, and a second pair of transversely opposed anchor points on opposite sides of said hull for engaging a strap that extends across said hull, said second pair of anchor points being disposed astern of said first pair of anchor points, and a strap attached to one of said first pair and said second pair of transversely opposed anchor points, wherein when said strap is attached to said first pair of transversely opposed anchor points, said strap is configured to pass over said thighs of said rider, and when said strap is attached to said second pair of transversely opposed anchor points, said strap is configured to pass under said thighs of said rider and over said calves of said rider, wherein by attaching said strap to said second pair, said rider is able to cause a center of gravity of a mass defined by a combination of said rider and said sled to move along a line perpendicular to said hull by using said knee to adjust said angle between said calf and said thigh, and wherein when said strap is attached to said first pair, movement of said center of gravity along said line is constrained, said sled further comprising a gunwale surrounding said hull, said gunwale being raised at a bow of said hull for suppressing intrusion of snow into said hull, and providing a handhold for said rider.

15. The manufacture of claim 14, further comprising means for selectively engaging said strap at one of a first longitudinal position and a second longitudinal position.

16. The manufacture of claim 14, wherein said channel has a progressively increasing depth.

17. The manufacture of claim 14, further comprising contoured shin pads for receiving said rider in a kneeling position.

18. The manufacture of claim 14, wherein said strap has a variable length.

19. The manufacture of claim 14, wherein said strap is made of an elastic material.

20. The manufacture of claim 14, further comprising springs extending between said hull and ends of said strap.

\* \* \* \* \*